United States Patent
Shamoto et al.

(10) Patent No.: US 7,031,723 B2
(45) Date of Patent: Apr. 18, 2006

(54) WIRELESS TERMINAL

(75) Inventors: Michio Shamoto, Niwa-gun (JP); Hiroyasu Ogino, Okazaki (JP); Kyoji Oda, Gamagori (JP); Toshihiro Takeuchi, Tokoname (JP); Atsushi Hayashida, Kariya (JP); Tatsuya Shintai, Chita-gun (JP)

(73) Assignee: Denso Corporation, Kariya (JP)

( * ) Notice: Subject to any disclaimer, the term of this patent is extended or adjusted under 35 U.S.C. 154(b) by 530 days.

(21) Appl. No.: 10/228,332

(22) Filed: Aug. 27, 2002

(65) Prior Publication Data

US 2003/0045304 A1 Mar. 6, 2003

(30) Foreign Application Priority Data

Aug. 30, 2001 (JP) ............................. 2001-261422

(51) Int. Cl.
*H04Q 7/32* (2006.01)
*H04Q 7/20* (2006.01)

(52) U.S. Cl. ................................ 455/456.1; 455/456.3; 455/456.5; 455/456.6; 455/550.1; 455/553.1; 455/422.1; 455/90.3; 342/357.01; 342/357.09; 342/357.14; 342/465

(58) Field of Classification Search ............. 455/550.1, 455/552.1, 553.1, 456.1, 456.2, 456.3, 456.4, 455/456.5, 456.6, 457, 422.1, 500, 517, 403, 455/426.1, 426.2, 3.02, 427, 428, 429, 423, 455/424, 432.1, 67.11, 556.1, 557, 575.1, 455/90.3; 342/357.1, 357.09, 357.14, 465

See application file for complete search history.

(56) References Cited

U.S. PATENT DOCUMENTS

| | | | | |
|---|---|---|---|---|
| 6,097,974 A | * | 8/2000 | Camp et al. | 455/575.7 |
| 6,119,003 A | * | 9/2000 | Kukkohovi | 455/435.2 |
| 6,192,224 B1 | * | 2/2001 | Grayson et al. | 455/168.1 |
| 6,289,279 B1 | * | 9/2001 | Ito et al. | 701/213 |
| 6,452,545 B1 | | 9/2002 | Araki et al. | |
| 6,636,740 B1 | * | 10/2003 | Ramesh | 455/456.1 |

FOREIGN PATENT DOCUMENTS

| | | |
|---|---|---|
| JP | A 11-239381 | 8/1999 |
| JP | 2000-348297 | 12/2000 |
| JP | 2001-209892 | 8/2001 |

* cited by examiner

*Primary Examiner*—Keith T. Ferguson
(74) *Attorney, Agent, or Firm*—Oliff & Berridge, PLC

(57) ABSTRACT

A wireless terminal is designed to prevent the user from having to wait a long time in case fetching of search data takes a long time. The wireless terminal, if it determines the need of long time for the search of GPS satellites by a GPS transceiver, inhibits the GPS transceiver from searching GPS satellites and operates on a CDMA transceiver to search for CDMA base stations. The wireless terminal fetches only CDMA base station data pertinent to the CDMA base stations and sends to a position data server, and the position data server points the location of the wireless terminal based solely on the CDMA base station data provided by the wireless terminal. Based on the inhibition of search of GPS satellites by the GPS transceiver, the time needed until the reception of positioning result can be reduced, and the user is prevented from being subjected to long time waiting.

18 Claims, 4 Drawing Sheets

WIRELESS TERMINAL

CROSS REFERENCE TO RELATED APPLICATION

This application is based on Japanese Patent Application No. 2001-261422 filed on Aug. 30, 2001 the contents of which are incorporated herein by reference.

BACKGROUND OF THE INVENTION

1. Field of the Invention

The present invention relates to a positioning system of wireless terminal, and more particularly, a wireless terminal using at least two positioning method, a computer program products for a wireless terminal and a method for transmitting information from a wireless terminal.

2. Related Art

Terminals having wireless communication functions are called wireless terminals. Mobile phones, mobile terminals and portable computers are among the known wireless terminals. Also known are positioning systems for pointing the locations of wireless terminals. For example, there are known positioning systems which use satellites and positioning systems which use ground base stations, e.g., telephone stations. Specifically, the Global Positioning System and the Code Division Multiple Access Communication System are available for use. In these positioning systems, each wireless terminal fetches data from stations of a positioning system, and has its location pointed based on the fetched data. For one example, a wireless terminal fetches search data from GPS satellites as stations of a GPS system. For another example, a wireless terminal fetches search data from CDMA base stations as stations of a mobile phone system.

For example, a mobile phone is operated by the user to commence the positioning operation. The mobile phone searches for CDMA base stations thereby to fetch CDMA base station data pertinent to the searched stations. The mobile phone sends the CDMA base station data to a position data server and requests the server to release assistant data useful for the mobile phone to search for GPS satellites.

The position data server receives the CDMA base station data from the mobile phone. The position data server determines the approximate location of the mobile phone based on the received CDMA base station data, computes assistant data useful for the mobile phone to search for GPS satellites, and sends the computed assistant data to the mobile phone. The mobile phone receives the assistant data, searches for GPS satellites based on the assistant data thereby to fetch GPS satellite data, and sends the fetched data to the position data server and requests the server to release a positioning result.

The position data server receives the GPS satellite data from the mobile phone. The position data server points the location of the mobile phone based on the GPS satellite data provided by the mobile phone and the CDMA base station data which has already been provided, and sends a positioning result indicative of the pointed location to the mobile phone.

This positioning system enables the mobile phone to search for GPS satellites based on assistant data provided by the position data server, and therefore it is possible for the whole system to reduce the time needed for positioning. The location of mobile phone is pointed by the position data server, instead of being done by the mobile phone itself, and therefore the mobile phone can lighten the duties and reduce the power consumption.

The mobile phone occasionally has to expend a long time in searching GPS satellite and a long time in fetching GPS satellite data due to adverse circumstances. In such a case of expending a long time for fetching GPS satellite data, the mobile phone is liable to fail the fetching of proper GPS satellite data. As a result, the conventional positioning system is deficient in utility in that the mobile phone user is subjected to long time waiting, but still get inaccurate positioning results.

SUMMARY OF THE INVENTION

An object of the present invention is to prevent the user from having to wait a long time.

According to one aspect of this invention, the operation of a first search means among multiple search means is inhibited or cancelled when a prescribed condition is met. After that, only search data fetched by a second search means is sent from a transceiver to a position data server. Accordingly, by setting the prescribed condition to be the need of long time in fetching first search data, the time needed to get a positioning result can be reduced based on the inhibition or cancellation of the operation of the first search means. In consequence, it becomes possible to prevent the user from having to wait a long time, and to enhance the system utility.

For one example, the prescribed condition can be the excess of search time from start to end of operation of the first search means over a prescribed time length. For another example, the condition can be a prescribed operation taken by the user on operation means.

In case the operation of the first search means is cancelled, first search data which has been fetched before the cancellation of operation of the first search means may also be sent to the position data server, so that the position data server can point the location of wireless terminal based on both the first search data and second search data.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DESCRIPTION OF THE PREFERRED EMBODIMENT

An embodiment of the present invention will be explained with reference to the drawings. In the first embodiment, the wireless terminal is applied to a mobile phone.

Figure 1:
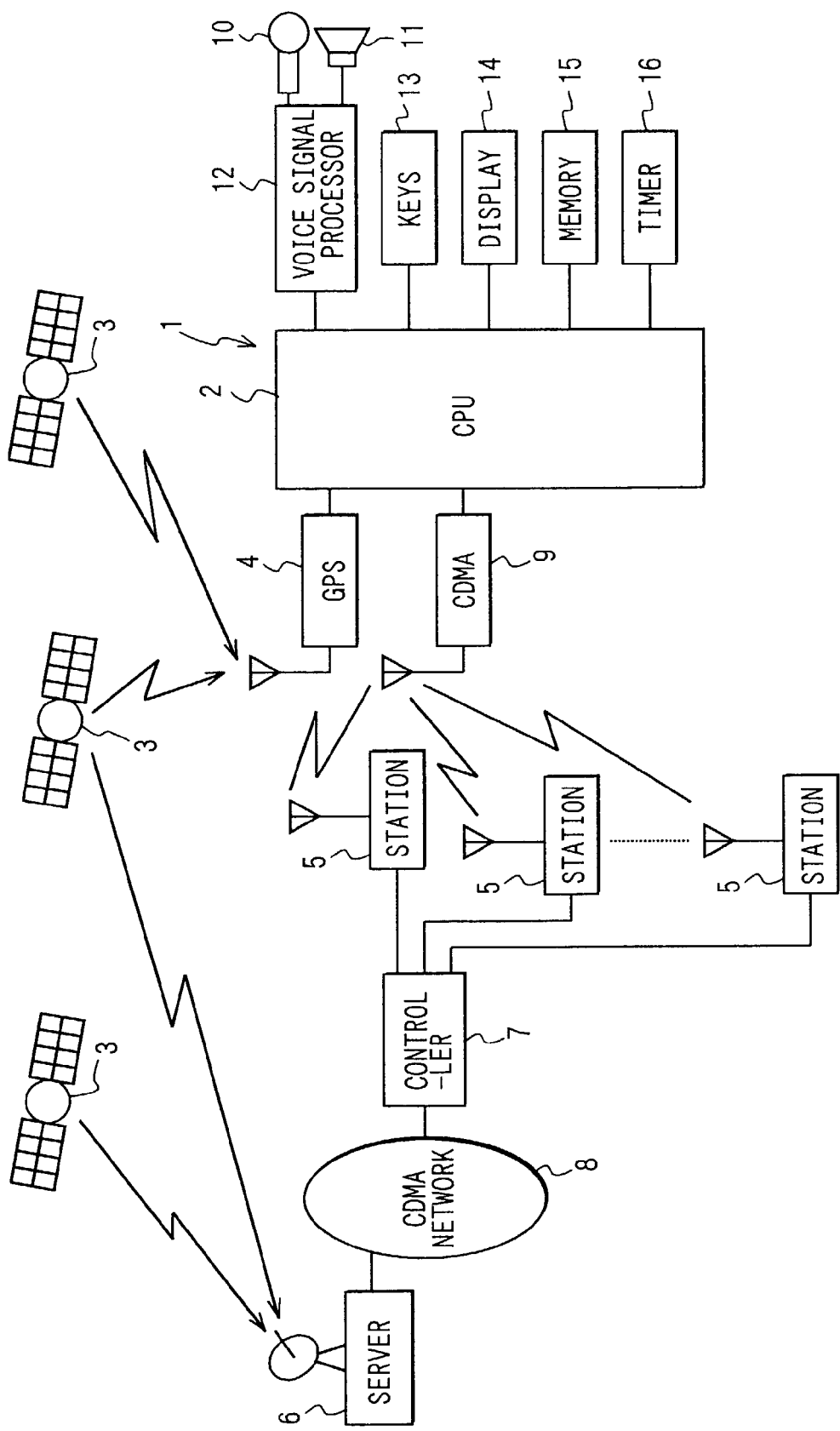
FIG. 1 is a block diagram of the wireless terminal positioning system showing the system arrangement and the functional blocks of a wireless terminal according to a first embodiment of the present invention.

FIG. 1 shows the system organization and the functional blocks of the mobile phone. In FIG. 1, a mobile phone 1 includes a CPU (Central Processing Unit) 2 as major component of a microcomputer (control means), which is connected with a GPS transceiver 4 (search means) which searches for GPS (Global Positioning System) satellites 3, a CDMA (Code Division Multiple Access) transceiver 9 (search means/transceiver) which searches for stations 5 and transacts data with a position data server 6 via a controller 7 and a CDMA network 8, a voice signal processor 12 which deals with a voice signal entered by a microphone 10 and a voice signal to be released by a speaker 11, a key panel 13 (operation means) which includes a talk start key, talk end key and numeric keys, a liquid crystal display panel 14 which displays the date and time and telephone number, a memory 15 which includes RAM (Random Access Memory) and ROM (Read Only Memory), and a timer 16 (timer means). The key panel 13 may be a touch-panel in combination with the display panel 14, and the GPS transceiver 4 and CDMA transceiver 9 may share an antenna.

Based on this organization, the mobile phone 1 sends GPS satellite data which has been fetched from GPS satellites 3 and CDMA base station data which has been fetched from CDMA base stations 5 to the position data server 6 via the CDMA base stations 5, controller 7 and CDMA network 8. The position data server 6 receives the GPS satellite data and CDMA base station data from the mobile phone 1, points the location of the mobile phone 1 based on the received GPS satellite data and CDMA base station data, and sends a positioning result indicative of the pointed location to the mobile phone 1 via the CDMA network 8, controller 7 and CDMA base stations 5.

Figure 2:
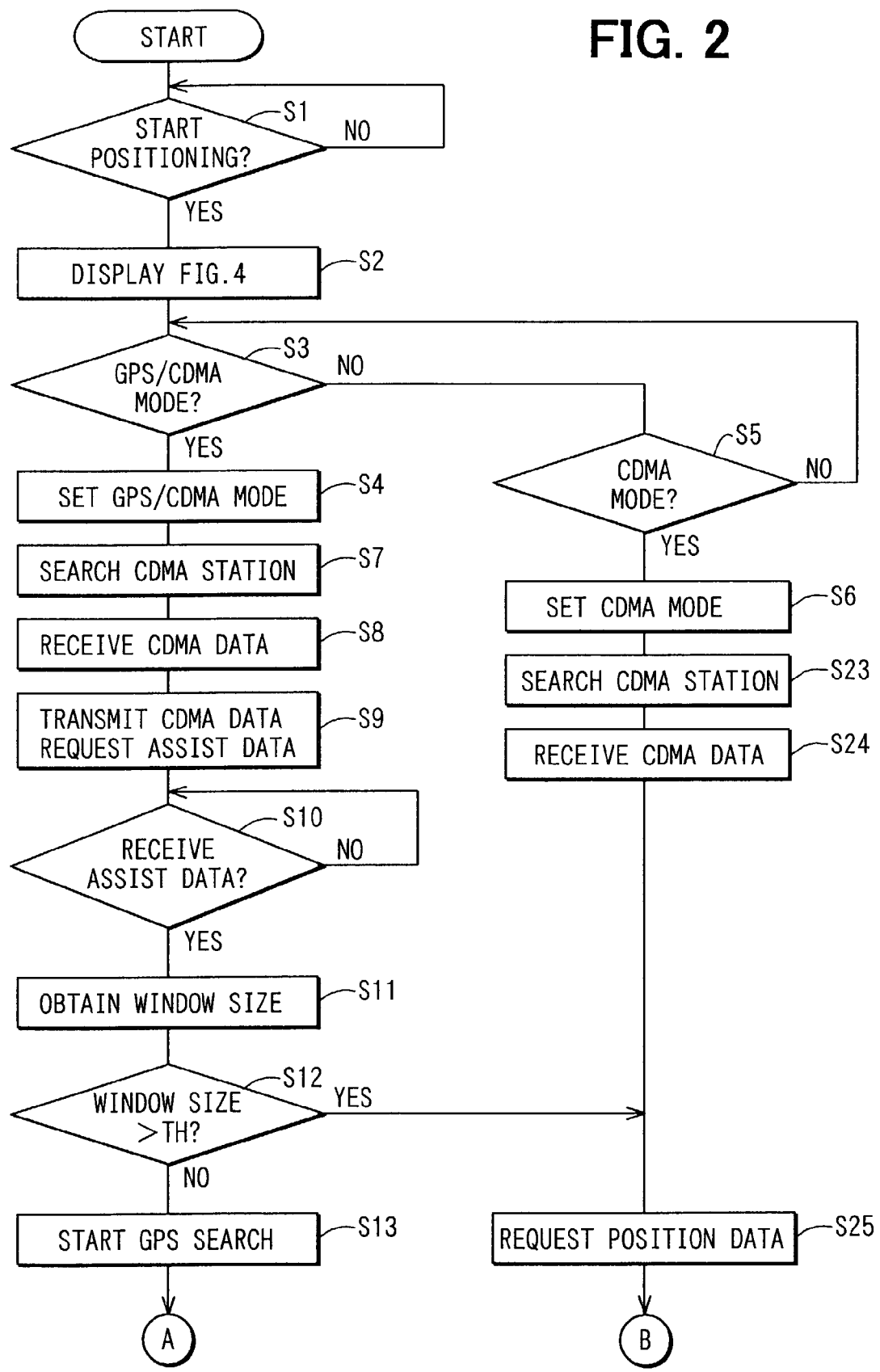
FIG. 2 is a part of a flowchart showing the control operation of the wireless terminal according to the first embodiment of the present invention.
Figure 3:
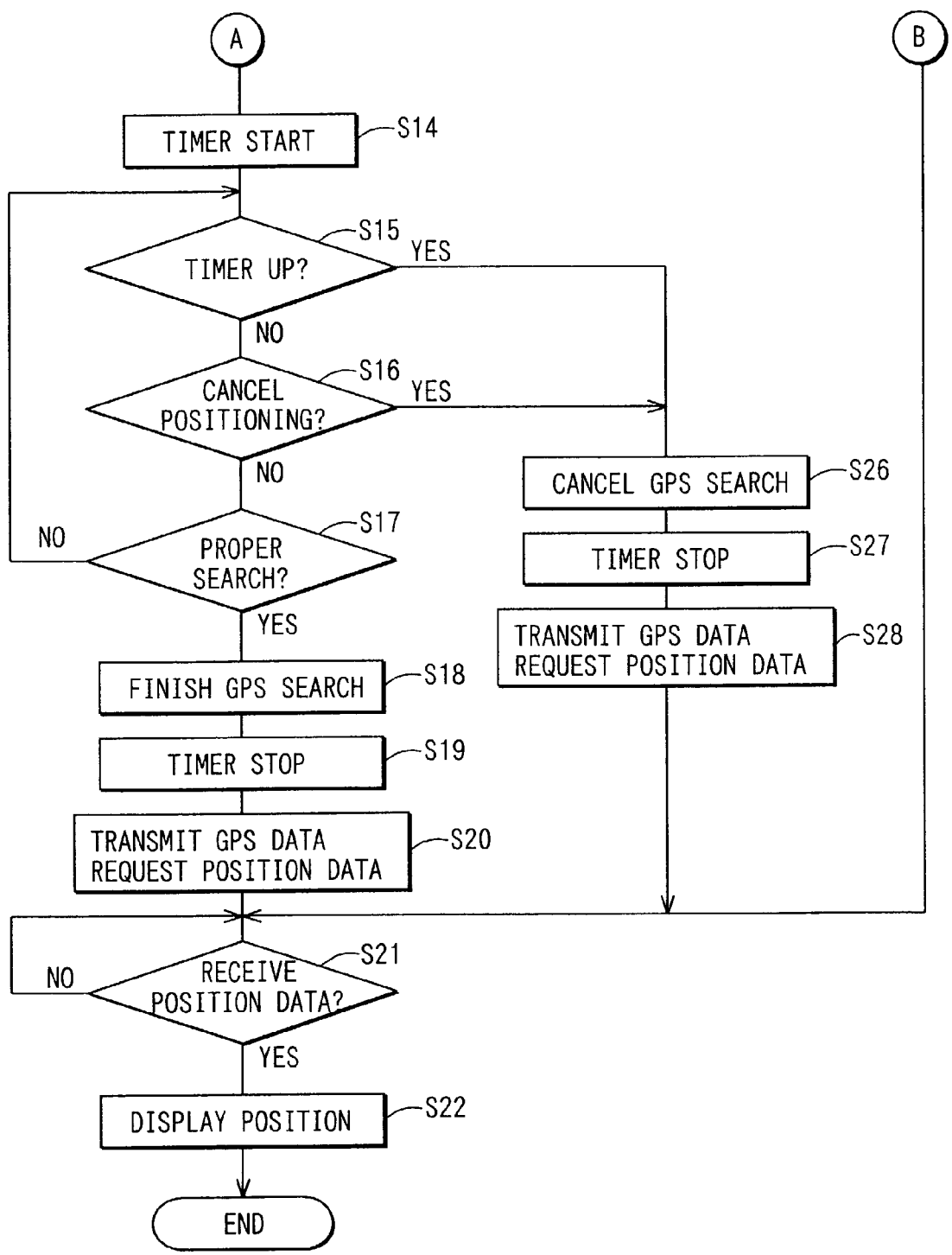
FIG. 3 is a remaining part of the flowchart showing the control operation of the wireless terminal according to the first embodiment of the present invention.
Figure 4:
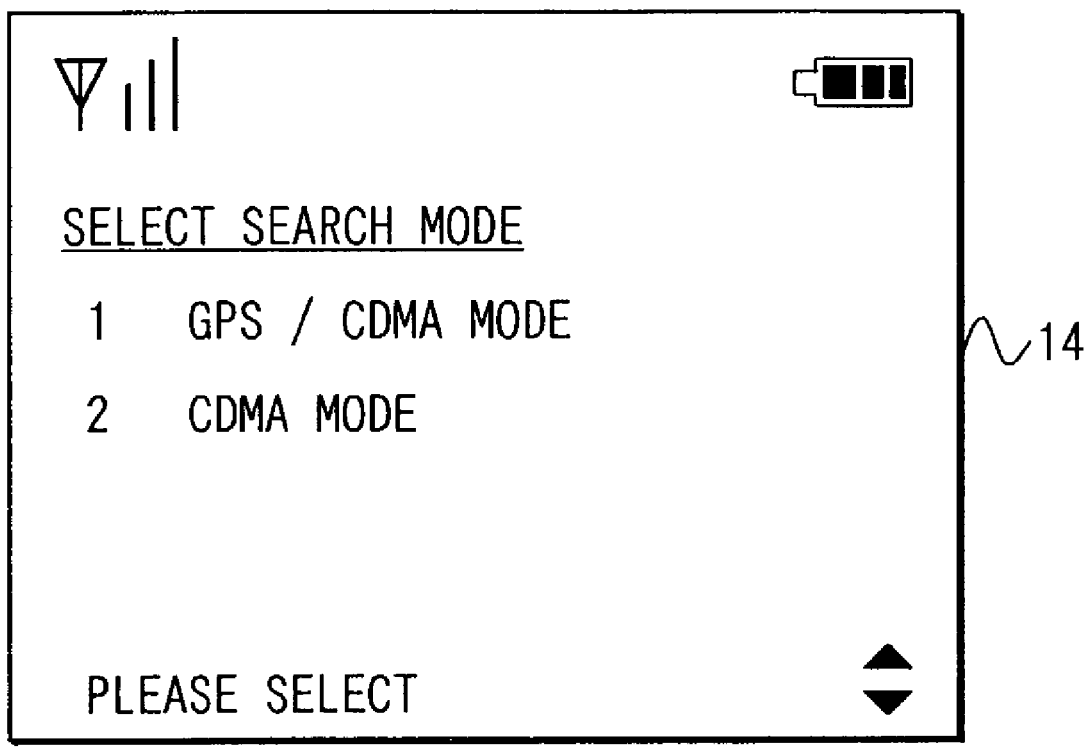
FIG. 4 is a diagram showing the content of display on the wireless terminal according to the first embodiment of the present invention.

Next, the positioning operation will be explained in more detail with reference to FIGS. 2, 3 and 4. FIGS. 2 and 3 show by flowchart the computer program which is run by the CPU 2 of the mobile phone 1.

The mobile phone 1 is instructed on its key panel 13 by the user to commence the positioning operation, which is detected by the CPU 2: ("yes" in step S1), and the CPU 2 operates on the display panel 14 to display a frame of search mode selection as shown in FIG. 4: (step S2). The user can choose either GPS/CDMA search mode or CDMA search mode.

When the CPU 2 detects the user's instruction of selection of GPS/CDMA search mode on the key panel 13: ("yes" in step S3), it sets the search mode to be the GPS/CDMA search mode: (step S4). Otherwise, when CPU 2 detects the user's instruction of selection of CDMA search mode (first prescribed operation) on the key panel 13: ("yes" in step S5), it sets the search mode to be the CDMA search mode: (step S6).

Upon setting the GPS/CDMA search mode, the CPU 2 operates on the CDMA transceiver 9 to search for CDMA base stations 5: (step S7) thereby to fetch CDMA base station data: (step S8). The CPU 2 operates on the CDMA transceiver 9 to send the CDMA base station data to the position data server 6 and request the server to release assistant data useful for the GPS transceiver 4 to make access to GPS satellites: (step S9).

The position data server 6 receives the CDMA base station data and the request of assistant data from the mobile phone 1, determines the approximate position of the mobile phone 1 based on the received CDMA base station data, computes assistant data useful for the mobile phone 1 to search for GPS satellites 3, and sends the computed assistant data to the mobile phone 1. The assistant data includes "window size" which indicates the search time needed for the mobile phone 1 to search for GPS satellites 3. The search time indicated by the window size data is longer when the disparity of phase difference of the GPS radio wave is larger, or it is shorter when the phase difference disparity is smaller.

On the part of the mobile phone 1, the CPU 2 detects the reception of assistant data from the position data server 6 by the CDMA transceiver 9: ("yes" in step S10), and extracts the window size data from the received assistant data: (step S11). The CPU 2 compares the time length indicated by the window size data with a preset threshold time length TH (first prescribed time length): (step S12). The CPU 2, upon detecting that the time length of window size does not exceed the threshold time length TH: ("no" in step S12), operates on the GPS transceiver 4 to commence the search for GPS satellites 3: (step S13), and operates on the timer 16 to commence the counting of a prescribed time length (second prescribed time length): (step S14).

The CPU 2 monitors the time expiration on the timer 16: (step S15) and also monitors the user's instruction of cancellation of positioning operation (second prescribed operation) on the key panel 13: (step S16), thereby to determine the appropriateness of the GPS satellite search result based on the measurement of the pseudo range and CN (carrier to noise) ratio of the GPS radio wave: (step S17).

If the CPU 2 finds the appropriateness of GPS satellite search result before the time expiration on the timer 16 in the absence of user's instruction of cancellation of positioning operation on the key panel 13: ("yes" in step S17), it operates on the GPS transceiver 4 to terminate the search of GPS satellites 3: (step S18) and operates on the timer 16 to terminate the time counting: (step S19). The CPU 2 operates on the CDMA transceiver 9 to send the GPS satellite data fetched from the GPS satellites 3 to the position data server 6 and request the server to release a positioning result: (step S20).

The position data server 6 receives the GPS satellite data and the request of assistant data from the mobile phone 1, points the location of the mobile phone 1 based on both the GPS satellite data provided by the mobile phone 1 and the CDMA base station data which has already been provided, and sends a positioning result indicative of the pointed location to the mobile phone 1. On the part of the mobile phone 1, the CPU 2 detects the reception of the positioning result from the position data server 6 by the CDMA transceiver 9: ("yes" in step S21), and operates on the display panel 14 to display the received positioning result: (step S22).

As described above, in case the mobile phone 1 has its search mode set to be GPS/CDMA search mode and, at the same time, the time length indicated by window size data provided by the position data server 6 does not exceed the threshold time length, i.e., if the time needed for the mobile phone 1 to search for GPS satellites 3 is relatively short, it searches for GPS satellites 3, fetches GPS satellite data of the GPS satellites 3, sends the GPS satellite data to the position data server 6, and receives a positioning result indicative of the location of mobile phone pointed by the position data server 6 based on both the GPS satellite data and CDMA base station data.

In contrast, when the CPU 2 sets the search mode to be CDMA search mode, it operates on the CDMA transceiver 9 to search for CDMA base stations 5: (step S23) thereby to fetch CDMA base station data of the CDMA base stations 5: (step S24), and inhibits the successive search of GPS satellites 3 by the GPS transceiver 4 and operates on the CDMA transceiver 9 to request the position data server 6 to release a positioning result while skipping the search of GPS satellites 3 by the GPS transceiver 4: (step S25).

When the CPU 2 sets the search mode to be GPS/CDMA search mode and detects that the time length indicated by window size data provided by the position data server 6 exceeds the threshold time length: ("yes" in step S12), it also in this case operates on the CDMA transceiver 9 to request the position data server 6 to release a positioning result while skipping the search of GPS satellites 3 by the GPS transceiver 4: (step S25). In this case, the position data server 6, upon receiving the request of positioning result from the mobile phone 1, points the location of the mobile phone 1 based solely on the CDMA base station data provided by the mobile phone 1, and sends a positioning result indicative of the pointed location to the mobile phone 1.

As described above, in case the mobile phone 1 has its search mode set to be CDMA search mode or the time length indicated by window size data provided by the position data server 6 exceeds the threshold time length, i.e., if the time needed for the mobile phone 1 to search for GPS satellites 3 is relatively long, the CPU 2 inhibits the GPS transceiver 4 from searching GPS satellites 3 and operates on the CDMA transceiver 9 to send only CDMA base station data of the CDMA base stations 5 to the position data server 6, while skipping the search of GPS satellites 3, and receive a positioning result which is based solely on the CDMA base station data from the position data server 6.

If the CPU 2 detects the time expiration on the timer 16: ("yes" in step S15) or the user's instruction of cancellation of positioning operation: ("yes" in step S16) before finding the appropriateness of search result of GPS satellites 3 conducted by the GPS transceiver 4, it operates on the GPS transceiver 4 to cancel the search of GPS satellites 3: (step S26), operates on the timer 16 to terminate the time counting: (step S27), and operates on the CDMA transceiver 9 to send the GPS satellite data which has been fetched from the GPS satellites 3 until then to the position data server 6 and request the server to release a positioning result: (step S28). In this case, the position data server 6, upon receiving the request of positioning result from the mobile phone 1, points the location of the mobile phone 1 based on both the GPS satellite data provided by the mobile phone 1 and the CDMA base station data which has already been provided, and sends a positioning result indicative of the pointed location to the mobile phone 1.

As described above, in case the mobile phone 1 has its search mode set to be GPS/CDMA search mode and, at the same time, the prescribed time is expired or the user instructs the cancellation of positioning after the commencement of search of GPS satellites 3, it cancels the search of GPS satellites 3, sends the GPS satellite data which has been fetched until then to the position data server 6, and receives from the position data server 6 a positioning result indicative of the location pointed based on both the GPS satellite data and CDMA base station data. In this case, it is not compulsory for the mobile phone 1 to send the GPS satellite data which has been fetched until then to the position data server 6, and in case the mobile phone 1 is designed to not send the GPS satellite data which has been fetched until then to the position data server 6, it can receive from the position data server 6 a positioning result indicative of the location pointed based solely on the CDMA base station data in the same manner as the case of having the setting of CDMA search mode.

According to the foregoing embodiment, when the mobile phone 1 has its search mode set to be CDMA search mode or when the time needed for the mobile phone 1 to search for GPS satellites 3 is relatively short, the search of GPS satellites 3 by the GPS transceiver 4 is inhibited so that the time expended until the reception of positioning result is reduced based on the inhibition of search of GPS satellites 3 by the GPS transceiver 4, whereby it becomes possible to prevent the user from having to wait a long time, and to enhance the system utility.

In case the mobile phone 1 has its search mode set to be GPS/CDMA search mode and, at the same time, the prescribed time is expired or the user instructs the cancellation of positioning after the commencement of search of GPS satellites 3, the search of GPS satellites 3 by the GPS transceiver 4 is cancelled so that the time expended until the reception of positioning result is reduced based on the cancellation of search of GPS satellites 3 by the GPS transceiver 4, whereby it becomes possible to prevent the user from having to wait a long time, and to enhance the system utility.

The present invention is not confined to the foregoing embodiment, but the alteration or expansion is possible as follows.

The wireless terminal can be other communication terminal such as a mobile terminal besides the mobile phone.

Instead of comparison of the time length indicated by window size data provided by the position data server with the threshold time length implemented by the mobile phone, an alternative system design can be such that these values are compared by the position data server, which responds to the excess of the window size time length over the threshold time length to send a message of inhibiting the search of GPS satellites to the mobile phone, which upon receiving the message operates to inhibit the search of GPS satellites.

Alternatively, the system may be designed such that the position data server modifies window size data so that the time length indicated by window size data does not exceed the threshold time length, and sends the modified window size data to the mobile phone. Although this system design sacrifices the ability of appropriate search of GPS satellites, it can reduce the time until the reception of positioning result by the mobile phone.

The mobile phone may be designed to have a learning function so that an optimal threshold value is determined automatically. The mobile phone may be designed to implement the threshold value determination only when a specific operation mode is selected.

The computer program which is run by the CPU may be down-loaded from a certain server via the telephone network or may be transferred from a CD-ROM (Compact Disk Read Only Memory) or magnetic card and installed, besides the provision in a memory at the time of manufacturing.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A wireless terminal, comprising:
   a plurality of search devices which are provided in correspondence to a plurality of positioning systems, including a Global Positioning System and a Mobile Phone System, and each of said plurality of search devices is adapted to search for stations of a corresponding positioning system; and
   a controller that controls the fetching of search data pertinent to the stations searched by the plurality of search devices and sends fetched search data from a transceiver to a position data server, and if a prescribed condition is met, cancels operation of a first search device that receives data from the Global Positioning System, and sends only search data fetched by a second search device that fetches the search data from a ground base station from the transceiver to the position data server.

2. A wireless terminal according to claim 1, wherein the controller controls the fetching of search data in terms of the search time since the commencement of operation until the end of operation of the first search device, and has the prescribed condition defined in terms of the excess of the fetched search time over a prescribed time length.

3. A wireless terminal according to claim 1, further including an operating device that is operated by a user, wherein the prescribed condition is execution of a prescribed operation of the operating device by the user.

4. A wireless terminal according to claim 1, wherein the controller controls fetching, from the position data server, of window size data indicative of time needed for search by the first search device, and the controller determines if the prescribed condition is met based on a value of the window size data.

5. A wireless terminal according to claim 1, wherein the controller controls memorizing a threshold value for the determining if the prescribed condition is met.

6. A wireless terminal according to claim 1, wherein the controller controls fetching, from the position data server, window size data indicative of time needed for a search by the first search device; and memorizes a threshold value for determining if the prescribed condition is met, and the controller determines that the prescribed condition is met if the window size data exceeds the threshold value.

7. A wireless terminal according to claim 1, wherein the controller controls:

sending, to the position data server in response to the entry of the cancellation instruction, search data which has been fetched until then; and receiving position data from the position data server.

8. A wireless terminal according to claim 1, wherein the controller controls fetching, from the position data server, data which indicates that a window size data indicative of the time needed for search by the first search device exceeds a threshold value, and the controller determines that the prescribed condition is met when the data is fetched.

9. A wireless terminal according to claim 1, wherein the controller controls entering an instruction of selection of a positioning operation based on both the first search device and second search device, or a positioning operation based solely on the second search device.

10. A computer program product for a wireless terminal, the program product comprising:

a computer readable program code means for determining whether a prescribed condition is met;

a computer readable program code means for canceling, if the prescribed condition is determined to be met, operation of a first search means for receiving data from a Global Positioning System, among a plurality of search means which are provided in correspondence to a plurality of positioning systems including the Global Positioning System and a Mobile Phone System and each of the plurality of search means is adapted to search for stations of a corresponding positioning system; and a computer readable program code means for sending only search data, which has been fetched by a second search means for fetching the search data from a ground base station, among the plurality of search means, from a transceiver to a position data server.

11. A search data sending method for a wireless terminal, the method comprising:

determining whether a prescribed condition is met;

canceling, if the prescribed condition is determined to be met, the operation of a first search device that receives data from a Global Positioning System, among a plurality of search devices which are provided in correspondence to a plurality of positioning systems, including the Global Positioning System and a Mobile Phone System, and each of which is adapted to search for stations of a corresponding positioning system; and sending only search data, which has been fetched by a second search device that fetches the search data from a ground base station, among the multiple search devices, from a transceiver to a position data server.

12. A wireless terminal, comprising:

a plurality of search devices which are provided in correspondence to a plurality of positioning systems, including a Global Positioning System and a Mobile Phone System, and each of which is adapted to search for stations of a corresponding positioning system; and a control device which fetches search data pertinent to the stations searched by the plurality of search devices and sends fetched search data from a transceiver to a position data server, and if a prescribed condition is met after a first search device among the plurality of search devices has commenced operation, canceling the operation of the first search device and sending search data fetched by a second search device among the plurality search devices from the transceiver to the position data server; and a timer which measures a time length since the commencement of operation of the first search device, wherein the prescribed condition is expiration of a prescribed time length measured by the timer.

13. A wireless terminal according to claim 12, wherein the control device sends the search data fetched by the second search device and search data, which has been fetched until the cancellation of the operation of the first search device, from the transceiver to the position data server.

14. A wireless terminal, comprising:

a plurality of search devices which are provided in correspondence to a plurality of positioning systems, including a Global Positioning System and a Mobile Phone System, and each of which is adapted to search for stations of a corresponding positioning system; and a control device which fetches search data pertinent to the stations searched by the plurality of search devices and sends fetched search data from a transceiver to a position data server, and if a prescribed condition is met after a first search device among the plurality of search devices has commenced operation, canceling the operation of the first search device and sending search data fetched by a second search device among the plurality search devices from the transceiver to the position data server; and an operating device which is operated by a user, wherein the prescribed condition is execution of a prescribed operation of the operating device by the user.

15. A computer program product for a wireless terminal, the program product comprising:

a computer readable program code for determining whether a prescribed condition is met after the commencement of operation of a first search device among a plurality of search devices which are provided in correspondence to a plurality of positioning systems, including the Global Positioning System and the Mobile Phone System, and each of which is adapted to search for stations of a corresponding positioning system;

a computer readable program code for canceling the operation of the first search device if the prescribed condition is determined to be met;

a computer readable program code for sending search data, which has been fetched by at least a second search device among the plurality of search devices, from a transceiver to a position data server; and a computer readable program code for measuring the time length since the commencement of the operation of the first search device and for canceling the operation of the first search device when the prescribed condition is expiration of a prescribed measured time length.

16. A search data sending method for a wireless terminal, the method comprising:

determining whether a prescribed condition is met after commencement of operation of a first search device among a plurality of search devices which are provided in correspondence to a plurality of positioning systems, including a Global Positioning System and a Mobile Phone System, and each of which is adapted to search for stations of a corresponding positioning system;

measuring a time length since the commencement of the operation of the first search device;

canceling the operation of the first search device if a prescribed measured time length is determined to be met; and sending search data, which has been fetched by at least a second search device among the plurality of search devices, from a transceiver to a position data server.

17. A computer program product for a wireless terminal, the program product comprising:

a computer readable program code for determining whether a prescribed condition is met after commencement of an operation of a first search device among a plurality of search devices which are provided in correspondence to a plurality of positioning systems, including a Global Positioning System and a Mobile Phone System, and each of which is adapted to search for stations of a corresponding positioning system;

a computer readable program code for canceling the operation of the first search device if the prescribed condition is determined to be met;

a computer readable program code for sending search data, which has been fetched by at least a second search device among the plurality of search devices, from a transceiver to a position data server; and a computer readable program code for controlling an operating device operated by a user, and for determining whether the prescribed condition is met when a prescribed operation of the operating device by the user is executed.

18. A search data sending method for a wireless terminal, the method comprising:

determining whether a prescribed condition is met after commencement of an operation of a first search device among a plurality of search devices which are provided in correspondence to a plurality of positioning systems, including a Global Positioning System and a Mobile Phone System, and each of which is adapted to search for stations of a corresponding positioning system;

canceling the operation of the first search device if the prescribed condition is determined to be met; and sending search data, which has been fetched by at least a second search device among the plurality of search devices, from a transceiver to a position data server, wherein the prescribed condition is met when a prescribed operation of an operation device is executed by a user.

* * * * *